May 31, 1966     A. R. BLAKEY, JR., ET AL     3,253,967

PROCESS FOR PRODUCING FOAM CIGARETTE FILTERS

Filed Dec. 18, 1962

INVENTORS
ERNEST ALBERT COLEMAN II
ANGUS RUCKER BLAKEY, JR.

BY *Frank C. Hilberg Jr.*

ATTORNEY

United States Patent Office 3,253,967
Patented May 31, 1966

3,253,967
PROCESS FOR PRODUCING FOAM
CIGARETTE FILTERS
Angus Rucker Blakey, Jr., Kennett Square, Pa., and Ernest Albert Coleman II, Fairfax, Del., assignors to E. I. du Pont de Nemours and Company, Wilmington, Del., a corporation of Delaware
Filed Dec. 18, 1962, Ser. No. 245,481
5 Claims. (Cl. 156—1)

This invention relates to polyoxymethylene foams and their use in forming filters.

In the past, foams of synthetic resins have had closed cell structures at moderate densities. When such foams are crushed or otherwise treated to form an open cell structure, a foam having an irregular distribution of sizes of passages between cells results or the material crushes as in the case of closed cell polystyrene foams. Hence, controlling the performance of these foams in certain uses has been difficult.

It is an object of this invention to provide a ruptured cell, resilient, low density, thermoplastic, high modulus foam having a uniform distribution of cells of controllable size. A further object of this invention is to provide a ruptured cell foam cigarette filter. Another object is to provide a filter medium suitable for various gas and liquid filtration applications.

These and other objects are accomplished by the following invention in which a polyoxymethylene resin is extruded as a foam by injecting a fluid blowing agent into the resin melt just prior to extrusion (normally in the die end of the extruder). The resin preferably is blended with a nucleating agent prior to extrusion.

The polyoxymethylene resins used in this invention are polymers and copolymers having a structure in which all of the recurring units have the formula:

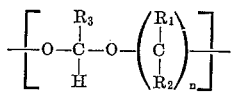

wherein each of $R_1$, $R_2$ and $R_3$ is selected from the group consisting of hydrogen, lower alkyl, and halogen substituted lower alkyl radicals, and wherein $n$ is an integer of from 0 to 3 and wherein $n$ is 0 in 85 to 100% of the recurring units. These polymers may be prepared by way of several processes for the polymerization or copolymerization of formaldehyde, trioxane, or the higher aldehydes. These polymers and processes for their preparation are described in part in United States patents:

2,734,889, issued February 14, 1956, to F. C. Starr, Jr.
2,768,994, issued October 30, 1956 to R. N. MacDonald
2,828,286, issued March 25, 1959 to R. N. MacDonald
2,841,570, issued July 1, 1958 to R. N. MacDonald
2,844,561, issued July 22, 1958 to M. F. Bechtold et al.
2,848,437, issued August 19, 1958 to W. P. Langsdorf et al.
2,994,687, issued August 1, 1961 to H. H. Goodman et al.
3,000,860, issued September 19, 1961 to N. Brown et al.
3,000,861, issued September 19, 1961 to N. Brown et al.

One variety of polyoxymethylene, i.e., polyoxymethylene diesters may be prepared by the processes described and claimed in United States Patents 2,964,500, issued December 13, 1960, to S. H. Jenkins et al., and 2,998,409, issued August 29, 1961, to S. Dal Nogare et al. Polyoxymethylene diethers may be prepared by the processes described and claimed in copending patent applications Serial No. 682,325, filed September 6, 1957, by N. Brown et al., and Serial No. 785,136, filed January 6, 1959, by N. Brown et al. Included within the term polyoxymethylene for purposes of this application are copolymers containing a predominance of oxymethylene groups, such as those prepared by the techniques set forth in United States Patents 2,828,287, issued March 25, 1958, to T. L. Cairns et al., 3,027,352, issued March 27, 1962, to K. W. Bartz et al., and 3,043,803, issued July 10, 1962, to C. D. Lewis et al., and in copending applications.

Ser. No. 35,419, filed June 13, 1960, by N. Brown et al.
Ser. No. 35,420, filed June 13, 1960, by N. Brown et al.
Ser. No. 35,421, filed June 13, 1960, by E. T. Cline et al.
Ser. No. 51,294, filed August 23, 1960, by E. T. Cline et al.
Ser. No. 91,318, filed February 24, 1961, by E. T. Cline.

The composition of the final product is primarily a polyoxymethylene resin, but may also include various stabilizers, fillers, colorants, blowing agents, processing aids, and nucleating agents.

Stabilizers may be divided into three types: antioxidants such as phenols, amines, and polypeptides; thermal stabilizers such as polyamides, polypeptides, amidines, amides, and photostabilizers such as benzophenone and derivatives of acrylic acid.

Suitable fillers include high molecular weight synthetic materials that are thermally stable at temperatures up to 250° C. and give neutral or basic decomposition products, natural or synthetic silicates or oxides including glass that exhibit a pH greater than 4 when slurried in distilled water (pH 7) at 1% concentration, metal powders, flakes and shot. Suitable metals include copper, iron, nickel and lead. The fillers may be in the form of powders, flakes, fibers, sheets or foams such as micro-balloons made of phenolic resins.

Colorants may be used including those which give a sludge pH of 4 or greater at 1% concentration. Useful classes of such colorants include pigments, dyes, pigment-dyes, metal-flakes, fluorescent materials, and carbon.

Processing aids may be used including additives which (a) decrease processing temperatures of the acetal resin, (b) increase or aid in the solubility of the blowing agents in the resin, (c) increase the melt strength or melt elasticity of the resin, or (d) decrease or increase friction or stick-slip of the resin melt against the material of construction of the extruder die orifice. Processing aids include aromatic hydrocarbons melting below 200° C. and boiling above 135° C. such as naphthalene and polymeric materials including polystyrene; materials of the same groups as blowing agents, hereinafter described, but melting below 200° C. and boiling above about 135° C. such as benzyl alcohol, glycerine, sulfur, and neutral or basic surface-active agents, such as silicone oil and polyalkene oxide adducts of alkylated phenols.

Suitable nucleating agents preferably are solids of high surface area, preferably 0.28 square meters per gram or greater and which produce more cells in the foam than would be produced in their absence. Examples of these materials include carbon black having a surface area of 0.1 to 30 m.²/g., Fiberglas having a surface area of 0.5 to 75 m.²/g., and talc, $H_2Mg_3(SiO_3)_4$, having a surface area of 0.01 to 20 m.²/g.

Suitable blowing agents are fluids which dissolve in acetal resin at temperatures of 150 to 250° C. at pressures of 1 to 100 atmospheres and have boiling points at atmospheric pressure of less than 150° C. Such blowing agents are selected from the classes consisting of water, ketones, alcohols, aldehydes, esters, halogenated hydrocarbons, nitriles, gases, such as carbon dioxide, nitrogen, ammonia, and formaldehyde and combinations thereof. Included in these classes are aqueous solutions of formaldehyde, aqueous solutions of ammonia (ammonium hydroxide) and aqueous solutions of methyl ethyl ketone. Also included in these classes are dichlorodifluoromethane, dichloromethane, chloroform, fluorotrichloromethane, 1,1,1-trichloroethane, 1,1,2-trifluoroperchloroethane, ethanol, butanol-2, ethyl acetate, acetaldehyde, ethyl chloride and acetonitrile. Of these, water, methyl ethyl ketone, methylene chloride, chloroform, methyl ethyl ketone in water, and chloroform in dichloromethane are preferred with water being especially preferred. Water is especially preferred because it has a very high capacity for absorbing heat which causes rapid freezing of the melt and an especially uniform sized rupture of the cells.

It is pointed out that some materials may serve more than one function. For instance, some nucleating agents may also serve as fillers or colorants, just as some processing aids also double as blowing agents.

The foams preferably have surface areas, as measured by the Brunauer-Emmett-Teller (B-E-T) nitrogen-adsorption method, greater than 0.4 m.²/gm., but less than 4.0 m.²/gm. The density of the foams preferably is between 0.001 gm./cc. and 0.320 m./cc. Wall thickness can be measured directly with a micrometer, or a single wall can be analyzed for thickness by determining if X-rays or an electron beam will pass through it. Walls over about 2 microns are opaque to X-rays and electron beams. Wall thickness of from 2 microns to 100 microns are preferred. The cells are preferably smaller than 1 mm. across.

These polyoxymethylenes have been found to make excellent cigarette filters, having the advantages of low cost, ease of fabrication, low pressure drop, resiliency, a high surface area; they are odorless, tasteless, white, and have high filter efficiency. By way of comparison, 50 to 80 mg. of polyoxymethylene foam removes as much tar and nicotine as 90 to 140 mg. of cellulose acetate in the commercial cigarette filters tested.

Cigarette filters can be made by passing the extruded foam in ribbon form under a wire brush running over a metal plate to shred the foam into portions ½ to 3 inches in length with a maximum diameter of about ⅛ inch. The shreds are then assembled into a filter by the same technique by which tobacco is normally wrapped with paper to form cigarettes. A preferred method of making filters is to wrap the extruded foam ribbon with paper.

In the drawing, FIGURE 1 is a cross section of an extruder used for extruding foams.

Figure 3:
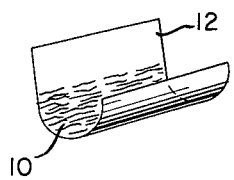
FIGURE 3 is a view of the shreds being wrapped.
Figure 4:
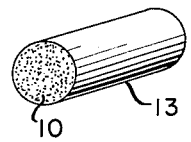
FIGURE 4 is a view of the completed filter.

The polyoxymethylene resin 1 is fed into the feed hopper 2 of extruder 3, maintained at from 150 to 200° C., and screw 4 rotated at a speed sufficient to give a pressure in excess of 200 p.s.i. at the die 6. The blowing agent is injected under pressure thru probe 5, and the resin extruded from die 6, whereupon the blowing agent expands to form foam 7. The foam is cut into blocks and then fed on conveyor belt 8 under wire brush 9 to produce shredded foam 10 which is gathered in container 11. The foam is then poured into a wrapper 12 as in FIGURE 3 which is then rolled up to form a filter 13 in FIGURE 4. In the preferred method a plurality (3-6) of ribbons are wrapped with paper and cut to length to form a filter similar to that illustrated in FIGURE 4.

The following examples are illustrative of the invention.

EXAMPLE 1

Figure 1:
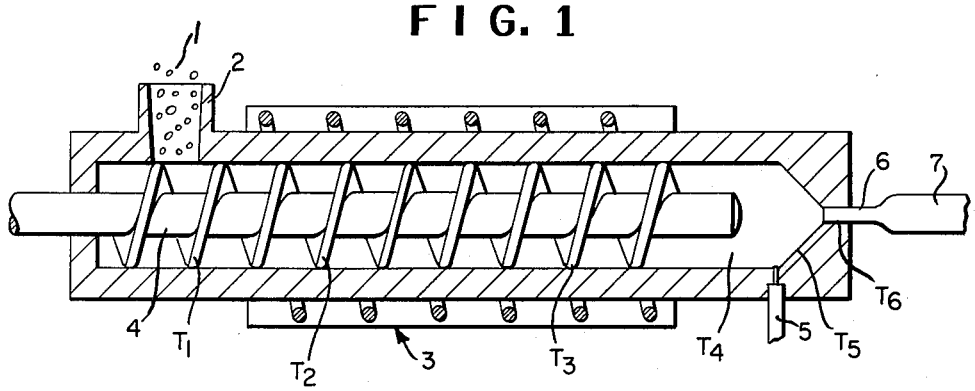
Figure 2:
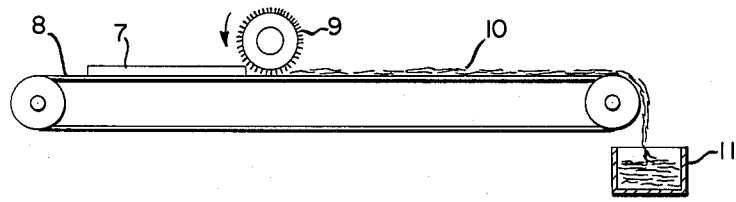
FIGURE 2 is a side view of the foam shredder.

A 2 inch extruder as shown in FIGURE 1 is used, with the injection probe 6 inches from the die slit which measures 0.115 by 1 inch. The extruder screw is driven by a motor at screw speeds varying from 50 to 120 r.p.m., and a constant barrel pressure of about 4500 p.s.i. A polyoxymethylene diacetate having a broad molecular weight distribution of 20,000–100,000 made by blending resins of different molecular weights containing 1% by weight of a terpolymer of 38% polycaprolactam, 35% polyhexamethylene adipamide, and 27% polyhexamethylene sebacamide and 0.1% by weight of 4,4'-butylidene bis(4-methyl-6-tertiary-butyl phenol) mixed with 2% Fiberglas having a diameter of 0.003 and a length of ¹⁄₆₄–¼", and 1% naphthalene is fed into the extruder. The output of the extruder varied from 50 to 80 lbs./hr., and 5 to 30 lbs./hr. of water was injected as the blowing agent. The melt in the barrel was maintained at the following temperatures at the locations indicated in FIGURE 1, $T_1$ 210° C., $T_2$ 200° C., $T_3$ 185° C., $T_4$ 180° C., $T_5$ 180° C., $T_6$ 180° C. The resulting foam had a density of 0.03 g./cc., and an average cell size of 0.5 mm., which ranged from 0.1 to 1.0 mm. of which over 80% were open cells and less than 20% were closed cells as judged by microscopic examination of cell walls.

Example 1 was repeated using the same apparatus but varying the conditions and the materials used. The results are reported in Examples 2 to 4 set forth in Table I. In Example 3, a four-hole ³⁄₁₆ inch beading die was substituted for the dye used in Examples 1, 2 and 4. In Example 4, a 4" diameter radial foamed film die was used. The polymer used in Example 2 was a copolymer of approximately 98.5 mole percent —CH₂O— units and 1.5 mole percent —CH₂CH₂O— units having an average molecular weight of about 35,000. The polymer used in Example 3 was a blend of ⅓ polyoxymethylene diacetate having an average molecular weight of 60,000 and ⅔ polyoxymethylene diacetate having an average molecular weight of 35,000. Example 4 used a blend of 50% polyoxymethylene diacetate having an average molecular weight of 60,000 and 50% of a polyoxymethylene diacetate having an average molecular weight of 35,000. The polymer used in each of Examples 3 and 4 contained 1% of a terpolymer of 38% polycaprolactam, 35% polyhexamethylene adipamide and 27% polyhexamethylene sebacamide and 1% of 4,4'-butylidene bis(4-methyl-6-tertiary butyl phenol).

The properties of the foams made in Examples 2 to 4 are reported in Table II.

*Table I*

CONDITIONS FOR FOAMING POLYOXYMETHYLENES

| Example | Temperature, ° C. | | | | | | Blowing Agent | Additives | Screw Speed, r.p.m. | Pressure, p.s.i. | | Rate, lbs./hr. | |
|---|---|---|---|---|---|---|---|---|---|---|---|---|---|
| | $T_1$ | $T_2$ | $T_3$ | $T_4$ | $T_5$ | $T_6$ | | | | Barrel | Die | Output | Blowing Agent |
| 2 | 210 | 200 | 185 | 170 | 165 | 165 | 9 vols. methyl/ethyl ketone, 1 vol. chloroform. | 5% glass fiber | 30–45 | 1,500 | 50 | 25 | 3 |
| 3 | 215 | 195 | 190 | 185 | 185 | 185 | Water | 5% glass fiber 5% polystyrene. | 70 | 3,000 | 500 | 45 | 7 |
| 4 | 215 | 195 | 195 | 185 | 185 | 140 | Methyl/ethyl ketone/water 1:2. | 2% naphthalene 0.5% glass fiber. | 60–80 | 1,000 | 200 | 45 | 7 |

Table II
STRUCTURE OF POLYOXYMETHYLENE FOAMS

| Example | Density, gm./cc. | Average Cell Size, average mm. | Ruptured Cells, percent | Closed Cells, percent |
|---------|------------------|--------------------------------|-------------------------|----------------------|
| 2       |                  | 0.2                            | >90                     | <10                  |
| 3       | 0.03             | 0.5                            | >90                     | <10                  |
| 4       | 0.03             | 0.08                           | >50                     | <50                  |

The foam produced in Example 1 is continuously passed under a rotating 3″ diameter wire brush 3 inches wide made of 12 inch diameter steel wires, to cut the foam into shreds with a maximum diameter of about ⅛ inch, averaging 1 inch in length, but varying from ½ to 3½ inches in length. The shreds are then rolled in cigarette papers to form a long filter which is then cut into ¼ inch lengths and attached to various brands of filter cigarettes to replace the original filter and tested. The test results of this and various other polyoxymethylene foam filters are reported in Table III. The test used was the "Cambridge Filter Disc Method" in which a glass filter disc is inserted in the smoke train from an artificially smoked cigarette. The efficiency of the cigarette filter is then ascertained by the weight of material caught by the glass filter disc. The pressure drop across the cigarette filter is ascertained before test smoking by a manometer filled with water with one end connected to the smoke train line and the other end open to the atmosphere so as to measure the pressure drop across the filter in inches of water. An air flow rate of 1050 cc./min. was used to measure pressure drop. A two second puff duration at 35 ml./puff is used in all the smoking tests. The filter disc was dried (1 hr. at 105° C.) before test smoking to avoid errors due to residual moisture on the glass filter. Runs 1 to 6 each used the tobacco end from the same brand of cigarette and smoked 49 mm. of cigarette. Runs 7 to 11 each used the tobacco end from the same brand of cigarette and smoked 46 mm. of cigarette. Run 5 used a filter made by wrapping 3 ribbons of the foam extruded in Example 1 with paper and then cutting to 15 mm. lengths. Run 6 used a filter made by wrapping 4 ribbons of the foam of Example 1 with paper and then cutting to 15 mm. lengths. Runs 2 to 4 and 8 to 11 used the foam filters shredded by means of a wire brush as described above.

Table III
PERFORMANCE OF POLYOXYMETHYLENE FOAMS IN CIGARETTE FILTERS

| Run | Filter | Wt. of Cigarette (mg.) | Wt. Filter Materials (mg.) | Pressure Drop in Inches/Water on Cigarette Plus Filter | Material Passed per Cigarette (mg.) |
|-----|--------|------------------------|----------------------------|--------------------------------------------------------|-------------------------------------|
| 1   | Commercial Cellulose Acetate #1. | 838 | 130 | 2.0 | 24 |
| 2   | Foam of Example 1 | 845 | 69 | 1.1 | 19 |
| 3   | ----do---- | 750 | 80 | 1.3 | 21 |
| 4   | ----do---- | 838 | 55 | 1.7 | 24 |
| 5   | ----do---- | 847 | 70 | 0.8 | 19 |
| 6   | ----do---- | 847 | 68 | 0.7 | 10 |
| 7   | Commercial Cellulose Acetate #2. |  | 93 | 1.4 | 25 |
| 8   | Foam of Example 1 |  | 93 | 1.5 | 22 |
| 9   | ----do---- |  | 56 | 3.0 | 19 |
| 10  | ----do---- |  | 59 | 4.5 | 13 |
| 11  | ----do---- |  | 32 | 2.1 | 24 |

As can be seen from Table III, the polyoxymethylene foam of this invention is more efficient than cellulose acetate for filtering tobacco smoke on a weight basis.

Other methods may be used to form cigarette filters. For example, chopped foam may be wrapped as above-disclosed for the shreds. Alternatively, a cylindrical shape predominantly open cell foam may be cut the length of the desired cigarette filter, or the foam ribbon from which shreds are made can be wrapped in paper to make cigarette filters. Both the chopped foam and cylindrical methods produce effective filters although they are not as efficient as the shredded filter or the foam ribbon type filters.

The foams of this invention have structures which are at least 50%, and preferably 75% ruptured celled. Other materials which are formed into open cell foams are formed first as closed cell foams and then crushed or otherwise mechanically treated to break the cell walls, rather than having the cell walls ruptured by the blowing agent upon extrusion. The procedure of this invention leaves residual cell walls which creates a large surface area while giving a good flow due to the large percentage of uniformly ruptured cells.

The extruded foams of this invention are useful as filter elements in a wide variety of applications. These applications include air conditioner filters, and solid-liquid separation filters such as automotive oil filter elements and dry cleaning solvent filters. The solid, as extruded foam can be used in these applications, and it has sufficient strength and resiliency that little, if any, support is needed for such filter elements when used in low pressure applications.

We claim:

1. A process of forming a predominantly ruptured polyoxymethylene foam for use as a cigarette filter comprising the steps of feeding a polyoxymethylene resin into an extruder maintained at from 150° C. to 250° C., and operated at a pressure above 200 pounds per square inch, and injecting a blowing agent into the polyoxymethylene resin melt before it leaves the die whereby the polyoxymethylene melt is blown to form a ruptured celled foam ribbon having a density of from 0.001 to 0.320 gram per cubic centimeter on leaving the extruder die, shredding the extruded foam to form shreds from ½ to 3½ inches in length with a maximum diameter of about ⅛ inch, and wrapping said foam to form a cigarette filter.

2. The process of forming a cigarette filter comprising the steps of shredding a ribbon of ruptured celled polyoxymethylene foam having a density of from 0.001 to 0.320 gram per cubic centimeter to form shreds from ½ to 3½ inches in length with a maximum diameter of ⅛ inch, and wrapping said shreds to form a cigarette filter.

3. The process of forming a cigarette filter comprising the steps of wrapping a plurality of ruptured celled foam polyoxymethylene ribbons having a density of from 0.001 to 0.320 gram per cubic centimeter and cutting the wrapped ribbons to the desired length.

4. The process of claim 1 wherein the shredding step is carried out with a wire brush.

5. The process of claim 2 wherein the shredding step is carried out with a wire brush.

(References on following page)

References Cited by the Examiner

UNITED STATES PATENTS

| | | | |
|---|---|---|---|
| 2,202,839 | 6/1940 | Davidson | 93—1 |
| 2,354,260 | 7/1944 | Haney et al. | 264—53 |
| 2,653,987 | 9/1953 | Batz | 260—2.5 XR |
| 2,739,134 | 3/1956 | Parry et al. | 264—205 |
| 2,770,241 | 11/1956 | Winkler | 131—208 |
| 2,820,461 | 1/1958 | Muller | 131—10 |
| 2,849,932 | 9/1958 | Marogg | 93—1 |
| 2,853,741 | 9/1958 | Costa et al. | 161—402 XR |
| 2,975,483 | 3/1961 | Cooper et al. | 264—143 |
| 3,006,346 | 10/1961 | Golding | 131—10 |
| 3,039,908 | 6/1962 | Parmele | 156—200 |
| 3,067,147 | 12/1962 | Rubens et al. | 264—53 |

FOREIGN PATENTS 1,227,864   3/1960   France.

EARL M. BERGERT, *Primary Examiner.*

MELVIN D. REIN, J. J. BURNS, T. R. SAVOIE, *Examiners.*